US006879574B2

(12) United States Patent
Naghian et al.

(10) Patent No.: US 6,879,574 B2
(45) Date of Patent: Apr. 12, 2005

(54) MOBILE MESH AD-HOC NETWORKING

(75) Inventors: Siamäk Naghian, Espoo (FI); Tapio Lindstrom, Espoo (FI); Tero Kärkkäinen, Tampere (FI); Jarmo T. Mäkinen, Espoo (FI); Keijo Lähetkangas, Oulu (FI); Kai Mustonen, Oulu (FI)

(73) Assignee: Nokia Corporation, Espoo (FI)

( * ) Notice: Subject to any disclaimer, the term of this patent is extended or adjusted under 35 U.S.C. 154(b) by 83 days.

(21) Appl. No.: 10/179,477

(22) Filed: Jun. 24, 2002

(65) Prior Publication Data

US 2003/0235175 A1 Dec. 25, 2003

(51) Int. Cl.[7] .......................... H04L 12/28; H04L 12/66; H04Q 7/24
(52) U.S. Cl. .................. 370/338; 370/352; 370/401; 455/406; 455/411; 455/426.1; 455/426.2; 455/436
(58) Field of Search ................ 370/252, 254, 370/328, 329, 331, 338, 340, 341, 349, 351, 352, 389, 395.1, 401, 406, 465, 466, 467, 395.5, 409, 420, 310; 455/405, 406, 410, 411, 422.1, 426.1, 426.2, 436, 450, 509; 709/220, 223, 230, 249, 250, 252

(56) References Cited

U.S. PATENT DOCUMENTS 5,412,720 A * 5/1995 Hoarty ...................... 380/211
6,282,577 B1 * 8/2001 Okanoue et al. ............. 709/250
6,466,556 B1 * 10/2002 Boudreaux ................... 370/331
6,522,629 B1 * 2/2003 Anderson, Sr. .............. 370/236
6,535,498 B1 * 3/2003 Larsson et al. .............. 370/338
2001/0003191 A1 6/2001 Kovacs et al. ............... 709/226
2001/0018336 A1 8/2001 Okajima et al. ............. 455/403
2001/0022780 A1 9/2001 Mizutani et al. ............. 370/261
2002/0031108 A1 * 3/2002 Inoue .......................... 370/338
2002/0036991 A1 * 3/2002 Inoue .......................... 370/328

FOREIGN PATENT DOCUMENTS

| EP | 1 107 512 A1 | 12/1999 |
| EP | 1 111 874 A1 | 12/1999 |
| WO | WO 01/37497 A1 | 11/2000 |
| WO | WO 01/69862 A2 | 3/2001 |

OTHER PUBLICATIONS

Harry Newton, "Newton's Telecom Dictionary", Feb. 2000, 16th Edition, pp. 114 and 839.*

* cited by examiner

Primary Examiner—Alpus H. Hsu
(74) Attorney, Agent, or Firm—Darby & Darby PC

(57) ABSTRACT

An architectural solution in which standalone ad-hoc network cells are used as an extension of the backbone infrastructure in terms of network architecture or/and its service capabilities is provided. These Ad-Hoc networks will integrate to the Internet via cellular and other access networks. This integration brings new possibilities to network operators and ISP's. In its extended architecture, it is envisaged that the mobility issues are handled by utilizing the IP mobility capabilities, taking into account the mobile mesh Ad-Hoc specific requirements.

36 Claims, 7 Drawing Sheets

MOBILE MESH AD-HOC NETWORKING

FIELD OF THE INVENTION

The present invention relates to IP networks, and more particularly to establishing mobile mesh Ad-Hoc networking among terminals.

BACKGROUND OF THE INVENTION

Mobile Mesh Ad-Hoc Networking (MMAN), also referred to as packet radio and Ad-Hoc networking, has generated interest within academia during the last couple of decades. Recently, it has also been considered as a very attractive technology in creating new opportunities for both the communications industry and the mobile end users.

So far, most of the interest in Ad-Hoc networking has been from the military. Several militaries have developed battlefield applications where troops and vehicles are equipped with Ad-Hoc radios. These troops then form a communication network in the ever-changing battlefield environment. While ad-hoc applications seem to exist, they are not very common.

An early group of Ad-Hoc network has been citizen band radios, which provide efficient simple group voice communication in radio coverage area. More sophisticated voice applications operating in Ad-Hoc manner are cordless telephones. There are several standards in cordless telephony (both analog and digital). Infra red (IR) connections are widely used in remote controllers, and in peer-to-peer connections between mobile phones, PDA's and laptops. IR provides a simple and easy way to eliminate cables in very short connections.

Remote controls can also use a radio connection. Examples of this include radio "keys" that are used for cars and doors. Additionally, computer keyboards and mice can be connected via a radio connection. These are typically based on proprietary radios for each application. Bluetooth (BT) radio connection has been developed specially for mobile devices to connect to their short-range environment (mobile phones to laptops, headsets to mobile phones etc.) The BT radio is used mainly for single hop connections, and the BT devices form automatically a master-slave type of pico network. BT networks can be multi-layered so that a slave station may operate as a master for other slaves. Communication happens mainly between master and slave. Communication between two slaves happens via common master. BT is a practical way to eliminate cable connection in in-house connections. It is also more robust connection compared to Infra red connection and allows better mobility. Bluetooth is a standardized way to be used in applications, which earlier have used proprietary radios.

Wireless Local Area Networks (WLAN) also operates in an Ad-Hoc manner basically with single hop connections. Typical construction consists of WLAN Access Point (connected to network) and WLAN cards in Hosts. WLAN supports also peer-to-peer communication mainly for file transfer directly between hosts.

While some examples of Ad-Hoc networking are here now, the application of an ad-hoc network is not seamless. Ad-hoc networking is not as easy to use as any PC, PDA or mobile phone a user typically employs. Additionally, the services available in an Ad-hoc network are not similar to the services a user typically has in other networks controlled by an operator.

What is needed is a solution of how ad-hoc networking technology can be combined with the current and possible future network infrastructure in order to boost the service provisioning for the end user and facilitate the ubiquitous mobile computing, which will bring about a turning point in broadening the mobile applications and business.

SUMMARY OF THE INVENTION

The present invention is directed at addressing the above-mentioned shortcomings, disadvantages and problems, and will be understood by reading and studying the following specification.

According to one aspect of the invention, a mobile mesh Ad-Hoc network is established. The mobile mesh Ad-Hoc network is a hybrid network that supports features of conventional Ad-Hoc and infrastructure networks such as fixed and mobile networks. The dynamically configurable hybrid network, which consists of mobile and fixed network subsystems, and nodes/routers can make it possible for subscriber terminal to setup a seamless radio communication access to both the radio access network subsystems and to the other mobile nodes.

According to another aspect of the invention, the mobile mesh ad-hoc network consists of 1-N clusters of ad-hoc terminals forming ad-hoc sub networks. Each ad-hoc cell may have at least one terminal as a Trunk Node that handles the gateway role between the backbone access networks and the terminals in the "ad-hoc cell".

According to another aspect of the invention, applications relating to groups may be established within the Ad-Hoc network. For example, teenager and other group networking, home networking and Internet access, authentication applications and home networking, and so forth, may be established.

According to yet another aspect of the invention, the mobile mesh Ad-Hoc network supports many features. The network is self-configuring and may be a peer-to-peer network architecture instead of the traditional purely cellular or fixed architecture. The subscriber terminal becomes an integral part of the network infrastructure especially when forming an Ad-Hoc network.

According to still yet another aspect of the invention, many opportunities are created by using the mobile mesh Ad-Hoc networking technology. For example, operators have a new network in which to provide service. Additionally, users have a new network in which to exchange information.

According to a further aspect of the invention, the Ad-Hoc networks may be standalone Ad-Hoc networks (Ad-Hoc/ proximity domain) for certain applications and groups, or be integrated to other networks, such as the Internet, via cellular and other access networks. This integration brings new possibilities to network operators and ISP's. Mobility issues may be handled by utilizing the either IP mobility capabilities or other mobility mechanisms supported by the cellular systems, taking into account the mobile mesh Ad-Hoc specific requirements.

DETAILED DESCRIPTION OF THE PREFERRED EMBODIMENT

Figure 1:
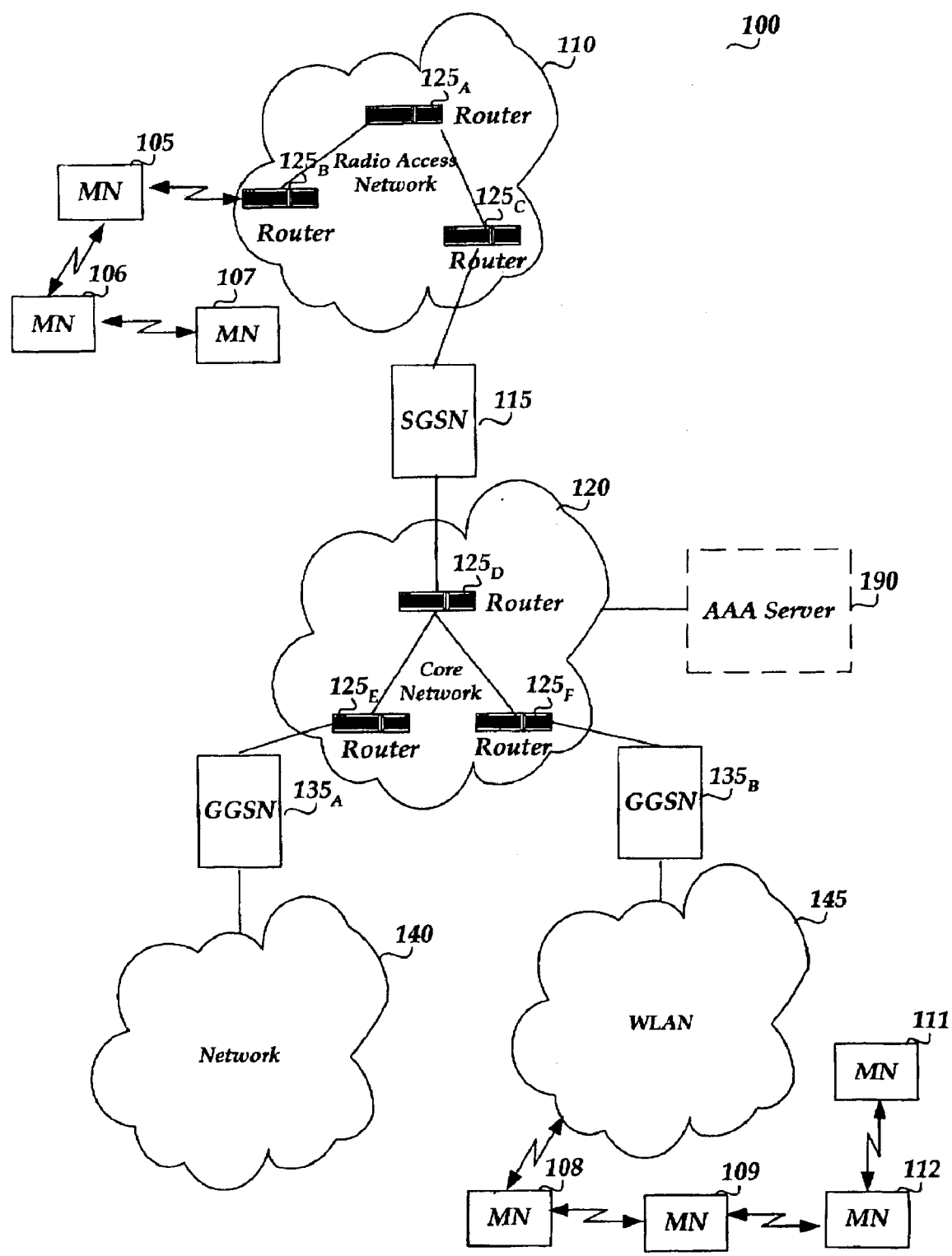
FIG. 1 illustrates an exemplary mobile IP network in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "Ad-Hoc Network" means a network structure that is temporary and its configuration is performed automatically and constantly because nodes may appear, disappear and move unexpectedly. An Ad-Hoc Network can be based on single hop or/and multi hop radio links. The term "AirHead" means a default router in mesh network that acts as an access point (AP). The term "Home RF" refers to a wireless technology that provides interoperability between wireless products in the home environment. The term "macromobility" refers to an approach to handle the mobility between network segments or different networks. The term "mesh" means a multipoint-to-multipoint network topology. The term "micromobility" refers to an approach to handle the mobility inside a mesh network due to the changes in the network topology. The term "mobile mesh" means a multipoint-to-multipoint network topology, in which mobile nodes may appear/disappear randomly and establish/terminate radio links to/from their geographical neighbor nodes. The term "multi hop" means that communication happens via intermediate/relaying nodes. The term "peer to peer" means direct communication between network terminals, which can be either single hop or multi hop. The term "node" refers to a node on a network. The term "mobile node, mobile device, and terminal" refer to a node on the network that is mobile. The term "flow" means a flow of packets. The term "Trunk Node" (TN) refers to a node that acts as a gateway between the backbone access network (e.g. WLAN, cellular, mesh) and the "child" terminals of the corresponding Ad-Hoc cell(s) orsubnet(s). In this context, a subnet can be formed in advance or on-demand by a number of fixed or mobile devices/routers or network elements with or without the aid of central control. The term "Ad-Hoc cell" refers to the area within Ad-Hoc domain, which comprises all child nodes with a distance less or equal to N hops from the Trunk Node and identified by an ID or its geographical coordinates. The term "support node" refers to both "GGSN" and "SGSN" nodes. The term "user" refers to any person or customer such as a business or organization that employs a mobile device to communicate or access resources over a mobile network.

The term "operator" refers to any technician or organization that maintains or services an IP based network. The term "identifier" includes an MSISDN number, an IP address, or any other information that relates to the location or identity of the user. Referring to the drawings, like numbers indicate like parts throughout the views. Additionally, a reference to the singular includes a reference to the plural unless otherwise stated or is inconsistent with the disclosure herein.

Proximity Mobile Mesh Ad-Hoc Networking

Figure 4:
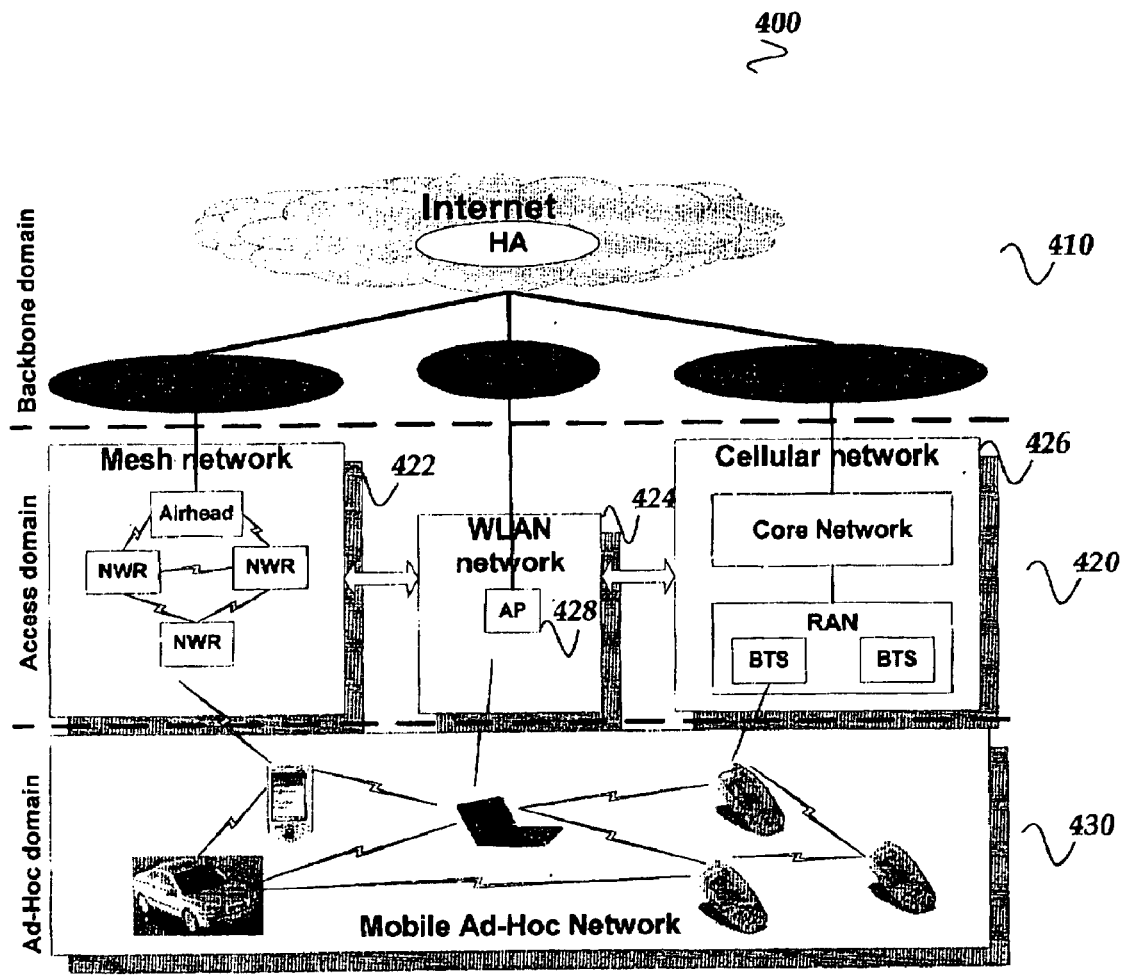
FIG. 4 illustrates a general architecture of a mobile mesh Ad-Hoc network.

FIG. 4 illustrates a general architecture of a mobile mesh Ad-Hoc network, in accordance with aspects of the invention. Three architectural hierarchies shown in mobile mesh Ad-Hoc network 400 include network 410, such as the Internet, access domain 420, and ad-hoc domain 430. According to one embodiment of the invention, the Internet infrastructure (410) is used as the backbone network. Access domain 420 includes different radio accesses that overlay the stand-alone Ad-Hoc networks, providing infrastructure-oriented radio connection for the subscriber terminal. The different radio accesses include mesh network 422, WLAN network 424, and cellular network 426. Ad-Hoc domain 430 is the actual Ad-Hoc network basis, which provides peer-to-peer single-hop, multi-hop and multi-branch radio communication, including both infrastructure-less and infrastructure-oriented radio communication for the subscriber terminal.

In principle, and depending on the presence of the access networks, overlaying the Ad-Hoc network, the subscriber terminal can communicate either with single radio access, multi-radio accesses, establish only peer-to-peer Ad-Hoc connection or make any combination of them. In this regard, the infrastructure networks are established to provide wireless subscriber terminal with specific services and range extension.

Ad-Hoc Domain (Proximity Domain)

A mobile Ad-Hoc network can be seen as an autonomous system of terminal routers and related hosts connected by wireless radio links. As the terminal routers can move freely and randomly and organize themselves arbitrarily, the network's topology may change rapidly. The Ad-Hoc domain can also contain plurality of fixed nodes enabling to route the data packet when needed. It is also possible that the ad-hoc terminal is not capable of signal routing (single hop) or otherwise can be able to cease its routing in association with some circumstances e.g. for lack of power.

Depending on the utilized mesh extension, the network topology may be relied on single hop or multi hop radio connection. In principle, and due to its nature, standalone Ad-Hoc networks can act independent of any operator or service provider. It is assumed for purposes of this discussion that Ad-Hoc network 430 consists of 1-N clusters of ad-hoc terminals forming ad-hoc subnetworks. Each ad-hoc cell may have at least one terminal as the Trunk Node. The Trunk Node acts as a gateway between access network 420 (e.g. mesh 422, WLAN 424, and cellular 426) and the "child" terminals of that cell e.g. in association with control signaling between the backbone network(s) and the ad-hoc cell. The Trunk Node can be seen as a logical role whose functions and physical location can vary based on case-specific manner and the criteria such as location coordinates and vicinity to the Access Point, movement characteristics of the Ad-Hoc cell nodes, number of hops, handover capability, service profile and service availability, Quality of Services, power level, routing metrics, charging policy, SIM/ID when handling the control functions between the overlaid network(s) and ad-hoc terminals (child entities), etc. The range of the Ad-Hoc network depends upon the utilized mesh/link technology. (See FIG. 3 and related discussion).

In principle, each node participating in the mobile mesh Ad-Hoc network may keep active link connections to N neighboring nodes. Nevertheless, a node can keep only a single active link connection to an Ad-Hoc network, if the node battery level is low, the node moves in a high speed, or the connection quality level is too low for maintaining two or more connections (e.g. due topology reasons).

Alternatives for Radio and Link Layer

The potential alternatives of current link layer technologies are overviewed in the following sections. In principle, the coverage of a standalone Ad-Hoc network is endless. However, because of the nature of radio link propagation, limitations may be encountered. The most visible advantages of the standalone Ad-Hoc network is in extending the infrastructure-oriented radio coverage and providing group and other local networking, such as appliances networking, in an infrastructureless environment.

Bluetooth Radios

Bluetooth is a short-range radio link intended to replace the cable(s) connecting portable and/or fixed electronic devices. Key features are robustness, low complexity, low power, and low cost.

Figure 5:
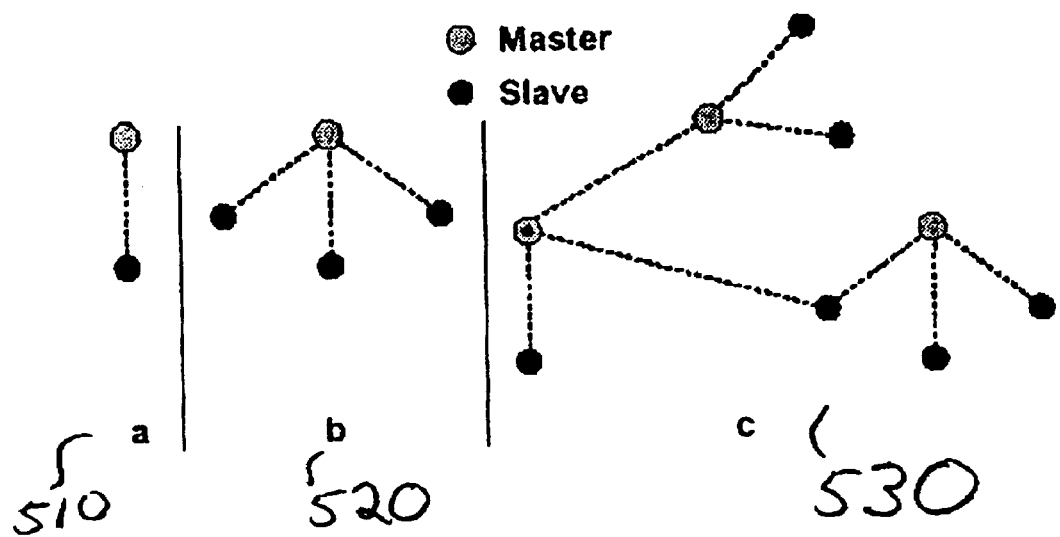
FIG. 5 illustrates piconets with a single slave operation, a multi-slave operation, and a scatternet.

FIG. 5 illustrates piconets with a single slave operation (510), a multi-slave operation (520), and a scatternet (530). The Bluetooth (BT) system provides a point-to-point connection (only two Bluetooth units involved), or a point-to-multipoint connection. In the point-to-multipoint connection, the channel is shared among several Bluetooth units.

Two or more units sharing the same channel form a piconet. One Bluetooth unit acts as the master of the piconet, whereas the other unit(s) acts as slave(s). Single slave operation is shown in panel 510. Up to seven slaves can be active in the piconet.

Panel 520 in FIG. 5 shows a master with three slaves. In addition, many more slaves can remain locked to the master in a so-called parked state. These parked slaves cannot be active on the channel, but remain synchronized to the master. Both for active and parked slaves, the channel access is controlled by the master. BT uses star topology network in which all traffic goes via Master node. Piconets can be joined together via multiradio nodes or nodes in scatternet mode providing needed interpiconet packet switching.

Panel 530 illustrates a scatternet. The fact that, in a BT network, all the traffic going via Master node wastes the scarce radio resources. All nodes in a piconet are also sharing single radio channel. This leads to inefficient radio resource usage especially in scatternet case, in which case two slaves in different piconets are communicating. Packet hops in that case could be Slave1-Master1-Slave1/Master2-Slave2, so a packet that is sent over air interface may be done three times even though the distance between the slave nodes could be less than meter. These three packet-sending events also happen on the same radio channel. If a mesh is to be built on BT technology there are some devices with more than one BT radio, so that all the traffic will not be on the same channel. The other alternative is to start using time division and more channels without multiradio devices.

Wireless LAN

In the link level, there are different ways to configure a WLAN-based network including Ad-Hoc and infrastructure-oriented networks. In the Ad-Hoc network, nodes are brought together to form a network "on the fly." In this mode, there are no fixed nodes and usually every node is able to communicate with every other node. The nodes communicate directly with each other on a peer-to-peer level sharing a given cell coverage area.

Figure 6:
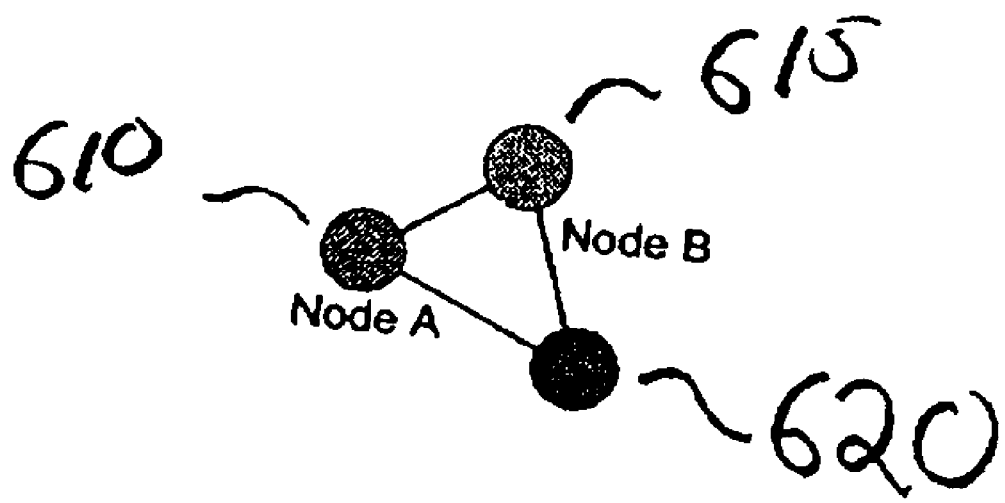
FIG. 6 illustrates a peer-to-peer connection using a WLAN-based network.

FIG. 6 illustrates a peer-to-peer connection using a WLAN-based network. As shown in FIG. 6, peer-to-peer connection includes master 610, master 615, and slave 620. This type of network is often formed on a temporary basis, thus certain level of mobility is supported automatically. Algorithms are used to "elect" one machine as the master of the network with the others being slaves. Typically, these algorithms in Ad-Hoc network architectures use a broadcast and flooding to all the other nodes when establishing who's who.

In principle, nodes can also act as repeaters thus there is no need to hear a special node like AP or have multiradio devices to attain connection, even if node can not hear beacon signal of the original network owner.

Native Mesh Link Layer

The wireless router mesh link layer may be a potential link layer solution. Some of the current wireless routers, such as some of the wireless routers developed by NOKIA, utilize Time Division Multiplex (TDM) radio modems with adaptive modulation scheme to make optimal use of the spectrum available. A Frequency Hopping Spread Spectrum (FHSS) transceiver with hopping time of 400 milliseconds is applied to combat interference, fading, and security breaches. Longer-range links can be established at 1 Mbps by changing modulation schemes from 4-level to 2-level Gaussian Frequency Shift Keying (GFSK). The actual throughput an end-user will receive will depend on the number of hops they are from the AirHead, and how the network is statistically multiplexed. Wireless routers may also be developed on top of OFDM radio with higher frequency operation than the current generation. The Orthogonal Frequency Division Multiplexing (OFDM) solution may also be enabled with adaptive modulation mechanism that may facilitate the Ad-Hoc network scalability. Synchronous network layer 2 solutions exploit benefits of TDM. All nodes are listening fixed channel at certain time for scheduling information; other timeslots are used for communication in different channels. According to one embodiment, six data channels are supported with one control channel. This results in a maximum 12 Mbit/s network capacity. Other combinations may be used. The mesh network can exploit all channels and peer-to-peer communication is not necessarily using the radio resources. Multiple Airheads can be used to attain higher bit rates on access to the Internet. According to an embodiment, the wireless routers use a link authentication scheme build into Neighbor Protocol, which also takes care of selecting logical neighbors from the physical neighbors among other tasks. According to one embodiment, an authentication scheme is three-way handshaking based on 32-bit security challenge.

Multimode Ad-Hoc/Cellular Terminals

Multimode terminals combine at least two radios one providing cellular connectivity and the other is used for Ad-Hoc networking. The radio used in Ad-Hoc networking could be using any of the above-mentioned techniques. BT being the most obvious one, but not excluding other possibilities. Multimode terminals are able to provide broader set of services to user than single mode cellular terminal. Depending on the current location of the user, the user might be within the Ad-Hoc coverage thus higher data rate services can be provided. Broad coverage area may be attained via a cellular network.

Access Domain

Referring back to FIG. 4, Access Domain 430 may consist of plurality of radio access technologies combined in various layouts, configurations and architecture hierarchies. Based on current access technologies, the most potential components of the access domain include $2^{nd}$ and $3^{rd}$ generation radio access for cellular systems, Wireless LAN, NWR mesh, and the like. Overviews of these will now be described. The access domain is capable of transferring multihop traffic, which means traffic from Ad-Hoc nodes behind a node connected to Access domain. Also, it supports context transfer of authentication for Ad-Hoc node moving between single hop and multi hop connections. Therefore, the authentication, authorization and counting network entities supporting the underlaid Ad-Hoc sub network can, physically, be part of the corresponding elements in the current infrastructure of cellular access network and each Ad-Hoc node connected by single or multiple hops to the network can individually authenticate to subscriber control elements.

Wireless Mesh Access Network

A wireless router, such as a wireless router developed by NOKIA (NWR), may be used as a building block of the mesh access network architecture. Principally, NWR-based mesh access mirrors the structure of the wired Internet. The NWR solution uses a wireless operating system that automatically routes traffic through the network in a multipoint-to-multipoint pattern. A master element of mesh access network is called AirHead. Internet access is established with the deployment of an access router AirHead connected to a wired or wireless backhaul. Subscriber routers are deployed throughout the coverage area of the AirHead. Each subscriber router not only provides access for attached users, but also becomes part of the network infrastructure by routing traffic through the network over multiple hops. This allows customers to join the network even if they are out of range of the AirHead.

Figure 7:
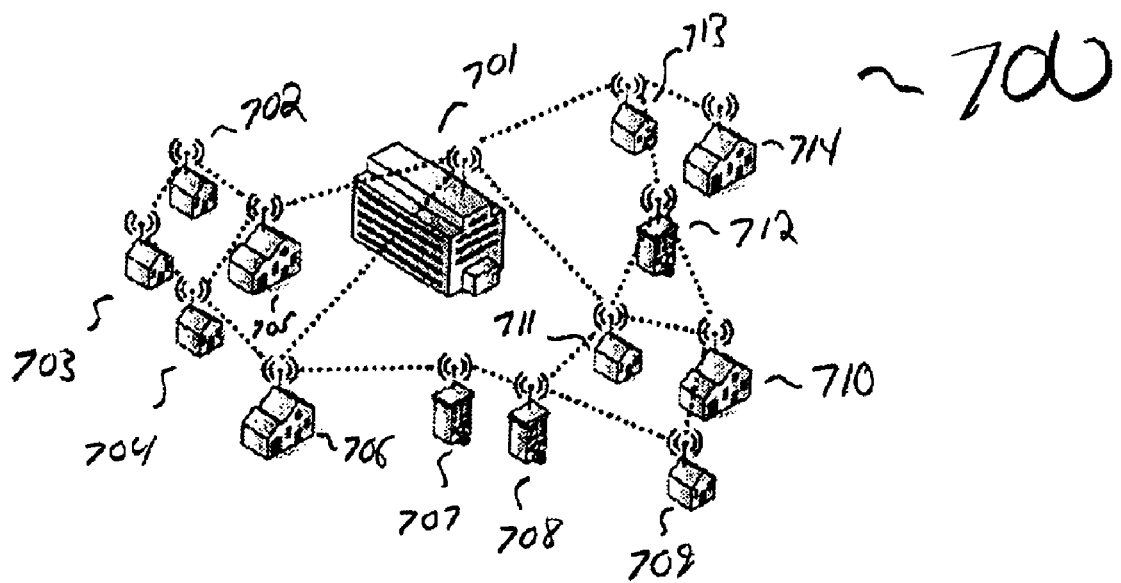
FIG. 7 depicts an example of NWR-based fixed mesh network for residential applications.

FIG. 7 depicts an example of NWR-based fixed mesh network for residential applications. As illustrated in the figure, NWR-based fixed mesh network 700 includes wireless routers 701–714 coupled together. It should be noted that wireless routers 701–714 involved in mesh network 700 may also be movable, providing a dynamic mesh infrastructure. Therefore, the elements of such access network can be either fixed or mobile, establishing a dynamic and highly scalable access network. In addition, by utilizing NWR with other topologies it is possible to establish a Hierarchical Mesh Network (HMN) with different network tiers, in which various mesh topologies such as tree, star, multi-leg star and mesh can be combined.

Wireless LAN Access Network

Referring back to FIG. 4, the WLAN access network consists of Access Point (AP) 428 and a group of terminals that are under the direct control of the AP, forming a Basic Service Set (BSS) as the fundamental building block of the access network. AP 428 forms a bridge between wireless and wired LANs while being the master for the network. AP 428 is analogous to a base station in cellular phone networks. When an AP is present, terminals do not communicate on a peer-to-peer basis. Thus, network topology is star. All communications between terminals or between a terminal and a wired network client go through the AP. AP's are not planned to be mobile, and they form part of the wired network infrastructure. Mobile nodes can roam between APs and therefore seamless campus-wide coverage is possible. A wireless LAN network in this configuration is said to be operating in the infrastructure mode. Some WLAN devices, such as some WLAN devices developed by NOKIA, support also peer-to-peer communication even inside infrastructure network as long as all parties hear AP transmission. The feature improves radio efficiency, as the packets are not traversing via AP 428.

Cellular Network

Radio Accesses of $2^{nd}$, $3^{rd}$ generation and also future cellular networks provide wide area coverage for mobile devices with various degree of mobility. In the case of a multimode Ad-Hoc terminal, the terminal can have radio connection through the radio network accesses such as GSM BSS, including GPRS and EDGE, and WCDMA. In this respect, the Ad-Hoc terminal acts as a conventional GSM or WCDMA terminal in addition to those features supported for Ad-Hoc purposes. The RAN, which basically consists of a group of base stations and base station controllers, is responsible for handling radio resource management, handling the overall control of radio connection, radio transmission and many other functions specified in the corresponding standards for those radio access systems. Therefore, The cellular access domain may also coordinate the radio resource of the trunk node as far as the traffic relaying over cellular network is concerned.

Mobility Management

In general, mobility means that the communication devices are capable of moving around in the network, yet maintaining their connections to a network. In mobile mesh Ad-Hoc networks the mobility issue departs from the current networks such as cellular of fixed mesh networks. This is because of two reasons. First, the problem of mobility is tied to the routing mechanism and second, the nodes that participate in routing are capable of moving. This situation takes the mobility problem also into the routing area, which means that the routing method in the network should be able to handle the mobility.

According to one embodiment of the invention, different levels of mobility are supported in mobile mesh Ad-Hoc network. Basically there are two kinds of mobility in the Ad-Hoc part of a mobile mesh Ad-Hoc network. The first one can be called as micro-mobility. This basically means that the structure of the Ad-Hoc part changes because of node movements. In other words, the whereabouts of the nodes changes so much that because of link brakes and new links born there will be new better routes in the network and some of the old routes will became unusable. Because the routing protocol is the one that takes care of the routes between nodes, it is the routing protocol used inside the mesh that takes care of the micro-mobility. In the context of the mobile IP, and within micro-mobility level, there is no necessary need to change the IP address of the node being in motion.

There is also another kind of mobility at the Ad-Hoc part of the network, that may be referred to as macro-mobility. Macro-mobility basically means that a node (a Mobile Router) that is part of the mesh network changes its location not only inside a mesh network but also from a mesh network to another network. This means that the node leaves the first mesh network behind and is not anymore part of it. The new network where to the node joins may be another mesh network or a network with another topology. According to one embodiment of the invention, the movements between the networks are handled with a method that is compatible with the current standards of the Internet. This makes it possible to make handovers between almost any kinds of networks. According to one embodiment, Mobile IP is used for handling this kind of mobility. In the context of the mobile IP, and within macro-mobility level, the network prefix of the moving node's address is changed. Each node has a local easy to use Ad-Hoc networking address. The address is auto configured by the Ad-Hoc networking protocols and it is checked to be unambiguous. A local link layer addressing is used for Ad-Hoc network internal connectivity. The local link address can be locally mapped to/from link MAC address.

The address is auto configured by the Ad-Hoc networking protocols. The address is checked to be unambiguous. Each node has a standard IP address used for communicating outside Ad-Hoc network domain.

Moreover, there may be also mobility below the Ad-Hoc part of the mesh. This is mobility of the nodes (e.g. cluster's child) that are not taking part to the packet forwarding inside the mesh, but that are connected to the Mobile Routers in the mesh. For example, a node connected to a Mobile Router may disconnect itself from the router and connect to another one. This kind of mobility may be handled either with Mobile IP or with the routing protocol inside the mesh network.

Authentication Services

The access to the mobile mesh Ad-Hoc network can be limited to authorized nodes, but also unlimited access is possible. Each node in the Ad-Hoc network can filter traffic to/from access network and discard access rights through the node. The basic authorization is based on mutual authentication between any two nodes, but also anonymous nodes can join with accepted authorization certificates. The authorization is performed in the mesh topology connection level.

As far as subscriber authentication is concerned, IP address based, SIM-based, or any combination of these methods, digital certification schemes such as digital signature and fingerprint, may be used. In case of SIM-based authentication, the control signaling between the terminal and the network can also be done by using IP protocol. To do this, and if the network is not fully IP-based, auxiliary logical and physical entities may be needed in order to optimize the transport resources by separating the path of control from the user data (by passing the user data directly to the destination). As a SIM-based example, let us assume that subscriber (e.g. Trunk Node) is intending to get access from a wireless radio access e.g. mesh network with cellular backbone. The terminal close to the airhead (Trunk Node) requests an IP address and invokes the network authentication process by sending an authentication message to the responsible network entity/server. The network entity/server maps the IP address to the corresponding IMSI and communicates with the authentication counterpart at cellular network e.g. HLR in $2^{nd}$ and $3^{rd}$ generation. Upon that, the authentication key(s) and other relevant random number(s) (authentication code) are sent to the terminal node (Mobile Router), preparing a mutual authentication. The rest of authentication process proceeds according to the authentication mechanisms used in the cellular systems. Depending on the hierarchy structure of the network protocols the authentication mechanism can be implemented in different levels. For instance, SIM and IP authentication mechanisms can be utilized within the context of the Connection Management (CM) protocols or SIMv6 protocols, respectively, and service level authentication can be implemented within the application level protocols.

Accounting

From the operators standpoint, Ad-Hoc communication can be established in different manners; all Ad-Hoc communications can be transferred via the operator network, only control signaling such as authentication is transferred via the operator network, only user data transferred via the operator network, or the entire Ad-Hoc communication is handled without the operator network involvement. Therefore, many different accounting schemes may be used. Some of the Ad-Hoc domain services may be free, or they may be charged for. When the network services are used either directly or in association with internetworking of two or more clusters of the ad-hoc groups (subnetworks) then the conventional SIM-based or application-specific IP charging is applied, in addition to the conventional flat rate charging experienced by the ISPs.

The network elements/servers of access domain monitors the data traffic and transfer it to the authentication entity or entities responsible for billing, wherein the statistics information is converted to the appropriated format. The authentication entity verifies the received accounting data to an authenticated terminal or TN. If needed, the network server may transfer this information to the corresponding servers/entities in the external network (other operators, ISPs, etc.) to support a seamless roaming operation between Ad-Hoc networks with different backbones. In the Ad-Hoc level there can also be additional charging approach, wherein the shared data or service is accounted and charged within the Ad-Hoc group. TN should handle the main responsibility for the Ad-Hoc level accounting and billing.

Figure 3:
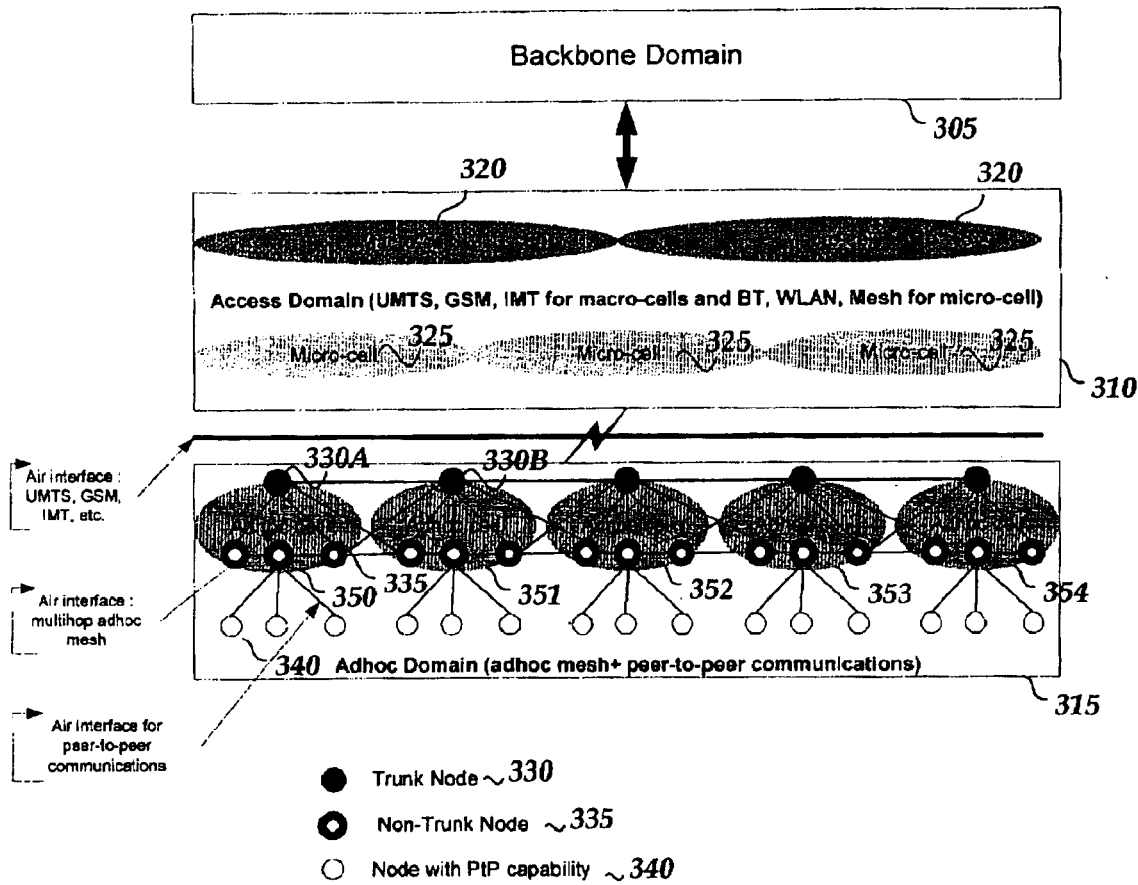
FIG. 3 illustrates an exemplary Ad-Hoc domain in accordance with aspects of the invention.

FIG. 3 illustrates an Ad-Hoc network, in accordance with aspects of the invention. As shown in the figure, the Ad-Hoc network includes backbone domain 305, access domain 310, and Ad-Hoc domain 315. Access domain 310 includes macro-cells 320 and micro-cells 325. Ad-Hoc domain includes Ad-Hoc cells 350, 351, 352, 353, and 354, trunk nodes 330, non-trunk nodes 335, and nodes with peer to peer (PtP) capability 340.

As illustrated, each node within the Ad-Hoc domain has a radio connection with its serving TN in the home Ad-Hoc cell. TNs 330 serve as access points to/from access domain 310 to the home Ad-Hoc cell nodes (350–354).

TNs of different cells can also perform an intermediate backbone, such as an Ad-Hoc backbone. TNs 330 can be mobile, fixed or variably stationary and mobile functional elements.

Each node may establish radio connections with all nodes (TNs and usual/non-TN nodes) of neighboring Ad-Hoc cells. However, each node has only one serving NT node. If a node is at the boundary of neighboring Ad-Hoc cell it may have more than one TN associated connections with neighboring TNs. For example, referring to the figure, NT node 835C has an associated connection with TN 330A and TN 330B. Having multibranch connections with more than one of the neighboring TNs may be used in order to help optimize the inter TN handovers and also utilize macro/micro diversity techniques to improve the link quality and decrease the interference. The multi-branch connection and serving TN association can be maintained up to a predefined range away from the serving TN. This distance can be defined based on, for instance, the signal strength of the terminal node to the serving TN and the neighbor TN, mobility range of the TN, and so forth.

TNs may be elected according to many different criteria. The following is a discussion of some exemplary selection criteria.

Service Availability (Operator-Aided Ad-Hoc Network)

This election criterion refers to the service capability of the TN. Some examples of service capability are those services associated with terminal's SIM. A TN with SIM associated services can be elected as a TN to distribute the available service via the backbone network, e.g. cellular network. It is also possible that a terminal node has entitled to use a certain service with lower tariff that other terminal nodes and so the available service can be shared between other terminal nodes.

Authentication Capability (Operator-Aided Ad-Hoc Network)

According to this criterion a node may be elected as a TN based on its capability to provide the authentication figures via the backbone networks, or otherwise. The authentication mechanism may include providing authentication signaling, authentication, encryption/decryption and integrity check keys arrangement, generating random parameters used in an authentication algorithm as well as any authentication action needed in association with the process.

Power Availability

Based on this criterion a node may be chosen as a TN based on a transmission power parameter associated with it. According to one embodiment of the invention, this means both power availability and power preservation (the degree of power needed to relay the Ad-Hoc information). Power availability means either the battery life of the Ad-Hoc node or its vicinity to the power supply means.

Link Stability

A node may be chosen as a TN based on the robustness of the radio link. Link stability refers to both link availability and the stability of the radio channel during a specific time span.

Mobility and Movement

A node may be elected as a TN based on the degree of mobility of the nodes in related with each other. It is not efficient to elect a low-speed TN for a group of terminal nodes with high mobility because in that case inter-node links are extremely exposed to changes.

Location Based Criteria

Node location coordinates can be used when electing the TN. Location information can be provided via the backbone network, GPS system, or any mobile positioning and assisted systems. A location parameter may refer also to the distance between the source and destination nodes as well as the distance between the terminal nodes (mainly TN) and the corresponding Access Point (AP) or Base Station (BS) of the backbone networks. The terminal node movement and the direction of the movement can also be included in location parameter.

Network-Assisted TN Election

A TN may be elected by the aid of radio access entities (with its assistance or independently) to which a radio communication is established. In this case it is the role of radio resource management entities to elect the appropriate TN or provide the TN election parameters. It is also possible that TNs are re-arranged based on the same mechanism during a communication period.

Regardless of the basic TN election mechanism any or a combination of above-mentioned TN election criteria can be used when making a TN election decision.

APPLICATION EXAMPLES

There are many potential application scenarios for both standalone and integrated ad-hoc networks. Some exemplary applications are discussed below.

Group Networking

Different groups have communication needs and potential needs for interaction. These needs are difficult to be satisfied cost effectively and efficiently with legacy communication systems. For example, teenagers belong to several kinds of these groups. The groups may be classroom, group of friends, hobby groups, neighborhood groups, gaming groups, and the like. The communication of these groups consists of: 1) Gaming, establishment of network gaming groups; 2) Chatting: multiple groups, everybody can set up a group; 3) Content/File transfer (music features, etc.); 4) Multimedia messaging including: text, drawings, pictures, sound clips, video clips, files; 5) Connection to Internet via gateways and support for local servers; 6) Short range voice and video calls. Support for couple of hops, longer connections with best effort principle; 7) Multicasting, enabling multicast of high level voice stream; and 8) Push services (also include location-based services). A push service is defined as a service initiated by an application server toward a mobile device. Examples of push services are sending advertisement, news, instant messaging, multimedia messaging, terminating VoIP call, etc. A push service can be combined with location services, creating additional value for the originated service. The network operates in multi hop mode and services are as seamless as possible with cellular services. The network may consist of different groups and clubs, which can be in service level very closed (password protection/encryption), but in networking level they are open. Connection to the Internet is provided commercially by ISPs. Additionally, sponsored Internet access may be provided by companies and organizations.

Neighborhood Networking and Internet Access

In Neighborhood networking the "network core" builds up from wireless routers that enable connections between houses. This network is utilized for communication between neighbors and as an access network by ISPs. Computers and PDA's in houses utilize routers as access points. In areas where wireless coverage is not available, the coverage is dynamically extended by creating an Ad-Hoc network. ISPs and other organizations provide sink points to Internet, this operates mainly in commercial principle. In Neighborhood networking the applications are pretty much the same as in previous Teenager and other group networking area. On top of those services the network is used for real estate management and neighborhood security services (e.g. surveillance cameras).

Authentication, Access Rights and Authorization & PAN to PAN Networking

Common to this group of applications is that connections are normally very short. Connections are mainly single hop connections. The radio connection is used to transfer information that identifies the user/holder and his/her rights. The security requirement is from modest to high.

Home Networking

Local area networking in homes is taking its first steps. Wired networking has the problem of cabling that requires specific skills and construction work. Wireless self-configuring networks are the only solution to solve this application area challenges. First needs for this networking emerge when a household has several computers. Also entertainment electronics (set top boxes, DVD, TV, stereos, games consoles) need networking where Ad-Hoc networks are going to be used e.g. for transferring contents or control information. Electricity meters, gas meters, water meters, heating and air conditioning systems require control and remote access. Finally, smart home appliances may also be networked.

As was exemplified there are many different applications, which can benefit from the Ad-Hoc networking. An advantage provided is that the benefits of ad-hoc networking technology is established by tying it to the current network infrastructure, yet keeping it locally independent.

According to embodiments of the invention, the described Mobile Mesh Ad-Hoc Network utilizes a range of current standards. As shown in FIG. 4, access domain 420 of the mobile mesh network (MMN) consists of various radio accesses specified in different standards. These can include Bluetooth (BT), Wideband Code Division Multiple Access (WCDMA), Wireless Local Access Network (WLAN), Broadband Wireless Access Systems (BWA), High Performance Radio Local Area Network (HIPERLAN, Mobile Ad-Hoc Networks (MANET), and the like.

Frequency Regulation

The frequency regulation of the mobile mesh Ad-Hoc network depends on the utilized technologies within the Ad-Hoc and access domains. As far as the access domain of the mobile mesh Ad-Hoc network is concerned, current wireless router-based mesh operates in the license exempt 2.4–2.4835 GHz and 5.4 GHz bandwidths. According to another embodiment, the NWR-based mesh access supports ISM 5.8 GHz as well. Like Bluetooth, the Wireless LAN and Home RF accesses operate in the unlicensed ISM 2.4–2.4835 GHz bandwidth in addition to RF that operates in 300–428 GHz bandwidth. The operation frequency for the cellular RAN varies widely, depending on the radio technology used for establishing the networks as well as the regional frequency regulations. For example, in the case of 3 rd generation radio access, frequency portions of 1920–1980 MHz and 2110–2170 MHz will be used for WCDMA FDD in Europe and in most Asian regions. The availability of unpaired TDD bandwidth will be around 1900–1920 and 2020–2025 in Europe. In addition, Bluetooth operates in the unlicensed ISM band at 2.4 GHz.

Illustrative Operating Environment

With reference to FIG. 1, an exemplary mobile IP network in which the invention may operate is illustrated. As shown in the figure, mobile IP network 100 includes mobile nodes (MN) 105–109, 111, and 112, radio access network (RAN) 110, SGSN 115, core network 120, routers $125_{A-F}$, optional authentication, authorization, and accounting (AAA) server 190, GGSNs $135_{A-B}$, data network 140, and WLAN 145.

The connections and operation for mobile IP network 100 will now be described. MN 105 is coupled to radio access network (RAN) 110. Generally, the MNs may include any device capable of connecting to a wireless network such as radio access network 110, or other mobile nodes. Such devices include cellular telephones, smart phones, pagers, radio frequency (RF) devices, infrared (IR) devices, integrated devices combining one or more of the preceding devices, and the like. MN 105 may also include other devices that have a wireless interface such as Personal Digital Assistants (PDAs), handheld computers, personal computers, multiprocessor systems, microprocessor-based or programmable consumer electronics, network PCs, wearable computers, and the like. Mobile nodes 105–107 are coupled to each other and form an Ad-Hoc network. MN 108 is coupled to network 145. MNs 108, 109, 111, and 112 are coupled to each other and form another Ad-Hoc network.

Radio Access Network (RAN) 110 manages the radio resources and provides the user with a mechanism to access core network 120. Radio access network 110 transports information to and from devices capable of wireless communication, such as MN 105. Radio access network 110 may include both wireless and wired components. For example, radio access network 110 may include a cellular tower that is linked to a wired telephone network. Typically, the cellular tower carries communication to and from cell phones, pagers, and other wireless devices, and the wired telephone network carries communication to regular phones, long-distance communication links, and the like. As shown in the figure, RAN 110 includes routers $125_{A-C}$. Briefly described, AAA server 190 may be used to monitor and aid in carrying out the operator's control for the communication through its networks. According to this particular embodiment, each router may provide information to AAA server 190 such that its policies may be implemented.

Some nodes may be General Packet Radio Service (GPRS) nodes. For example, Serving GPRS Support Node (SGSN) 115 may send and receive data from mobile nodes, such as MN 105, over RAN 110. SGSN 115 also maintains location information relating to MN 105. SGSN 115 communicates between MN 105 and Gateway GPRS Support Node (GGSN)s $135_{A-B}$ through core network 120. According to one embodiment of the invention, AAA server 190 communicates with RAN 110 and core network 120.

Core network 120 is an IP packet based backbone network that includes routers, such as routers $125_{D-F}$, to connect the support nodes in the network. Routers are intermediary devices on a communications network that expedite message delivery. Routers may be wired or wireless devices. On a single network linking many computers through a mesh of possible connections, a router receives transmitted messages and forwards them to their correct destinations over available routes. Routers may be a simple computing device or a complex computing device. For example, a router may be a computer including memory, processors, and network interface units. A router may be included in a mobile node (not shown).

GGSNs $135_{A-B}$ are coupled to core network 120 through routers $125_{A-C}$ and act as wireless gateways to data networks, such as network 140 and WLAN 145. Networks 140 and 145 may be the public Internet or a private data network. GGSNs $135_{A-B}$ allow MN 105 to access network 140 and network 145.

AAA server 190 may be coupled to RAN 110 and core network 120 through communication mediums. AAA server 190 may be programmed by an operator with instructions to manage the policies relating to mobile IP network 100. AAA server 190 is an optional element.

The operator may set threshold levels to determine whether or not to accept a new flow based on different service classes for a particular user or group of users. The routers, or a dedicated network element, such as AAA server 190, may be used for this purpose. Utilizing an AAA server helps to enforce authentication, authorization, and accounting rules to help ensure end-to-end quality of service (QoS) for users. Operators have the flexibility to provide different AAA rules. For example, conversational traffic may be mapped into either the Expedited Forwarding (EF) class or Assured Forwarding (AF) class at the core network. The operator may employ a different charging structure for each class. Also, AAA rules may be established nodes using different signaling transports.

Furthermore, computers, and other related electronic devices may be connected to network 140 and WLAN network 145. The public Internet itself may be formed from a vast number of such interconnected networks, computers, and routers. Mobile IP network 100 may include many more components than those shown in FIG. 1. However, the components shown are sufficient to disclose an illustrative embodiment for practicing the present invention.

The media used to transmit information in the communication links as described above illustrate one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
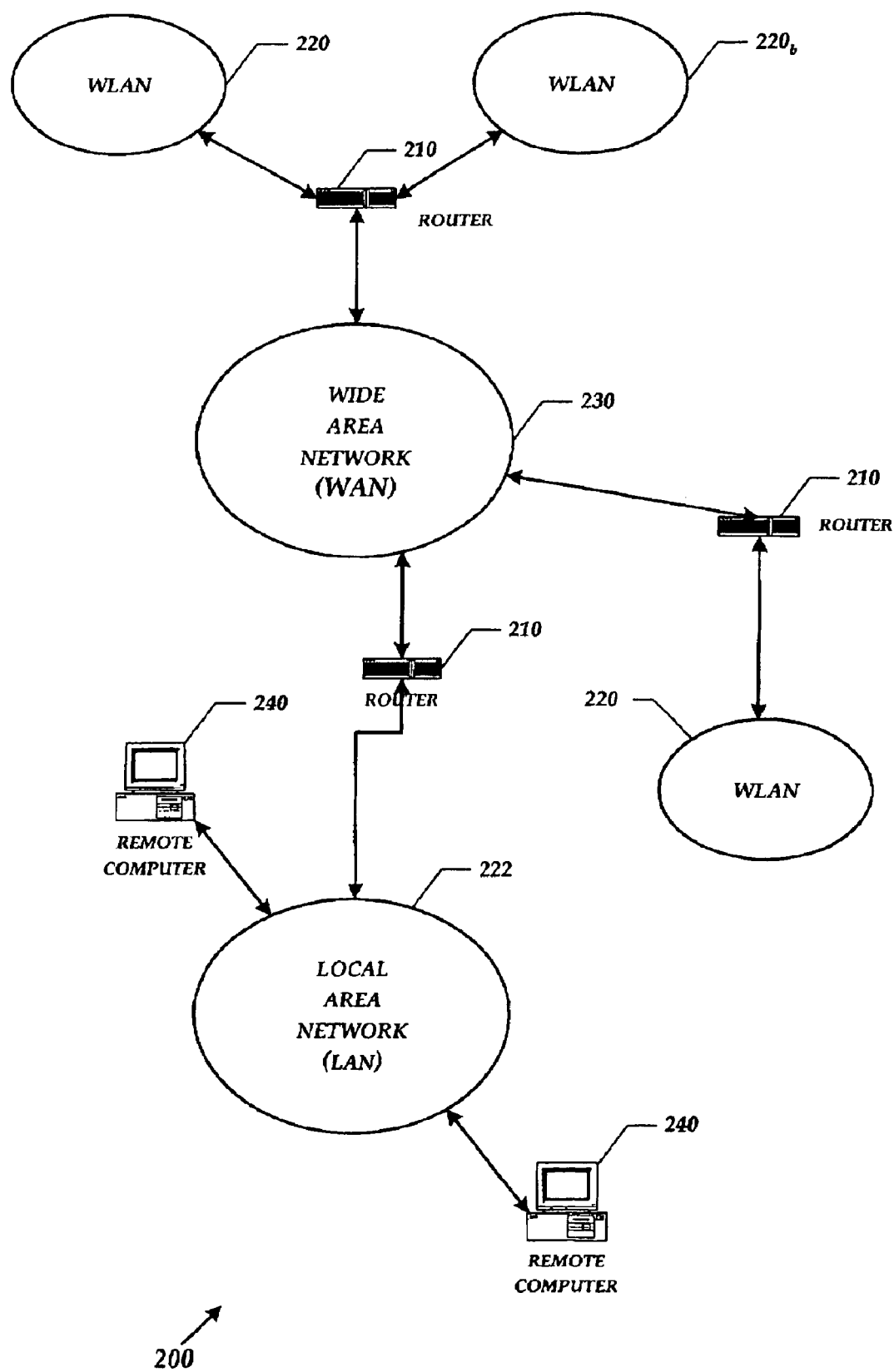
FIG. 2 shows a schematic diagram that illustrates an exemplary system overview in which wireless local area networks and a wide area network are interconnected by routers.

FIG. 2 shows another exemplary system in which the invention operates in which a number of wireless local area networks ("WLANs") $220_{a-c}$, local area network 222, and wide area network ("WAN") 230 interconnected by routers 210. On an interconnected set of LANs—including those based on differing architectures and protocols—, a router acts as a link between LANs, enabling messages to be sent from one to another. The router may be wireless or wired.

Communication links within LANs typically include wireless links, twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links. Furthermore, computers, such as remote computer 240, and other related electronic devices can be remotely connected to either WLANs $220_{a-c}$, LAN 222, or WAN 230 via another communication link. The number of WLANs, LANs, WANS, and routers in FIG. 2 may be increased or decreased without departing from the spirit or scope of this invention. As such, the Internet itself may be formed from a vast number of such interconnected networks, computers, and routers and that an embodiment of the invention could be practiced over the Internet without departing from the spirit and scope of the invention.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A system for a hybrid architecture in a communications system comprising:
   a backbone access network;
   an access domain;
   an Ad-Hoc domain underlying the access domain and arranged to provision wireless communication for nodes within a service area of the Ad-Hoc domain and the access domain;
   a trunk node elected from the nodes within the service area of the Ad-Hoc domain and configured to act as a gateway between the nodes within the Ad-Hoc domain and the backbone access network.

2. The system of claim 1, wherein the backbone access network is selected from a wired entity and a wireless entity.

3. The system of claim 1, wherein the trunk node is elected from a set of criteria, wherein the set of criteria comprises location coordinates, movement characteristics of the nodes, a number of hops, a handover capability, a service profile, service availability, a Quality of Service, a power level, routing metrics, an accounting and billing policy, and an identifier.

4. The system of claim 1, further comprising an accounting and billing mechanism.

5. The system of claim 1, further comprising an authentication mechanism.

6. The system of claim 5, wherein the authentication mechanism is configured to authorize the trunk node to join the nodes within the Ad-Hoc domain to the backbone access network or/and an Ad-Hoc sub network of nodes.

7. The system of claim 5, wherein the authentication mechanism may be selected from a set of mechanisms comprising a mechanism for providing authentication signaling, a mechanism for providing authentication, a mechanism for encryption/decryption and integrity check keys arrangement, and a method for generating random parameters used in an authentication algorithm.

8. The system of claim 1, wherein the Ad-Hoc domain comprises a standalone proximity Ad-Hoc network.

9. The system of claim 1, wherein the Ad-Hoc domain is integrated into other networks.

10. The system of claim 1, wherein the backbone access network is an Internet infrastructure.

11. The system of claim 1, wherein the access domain includes radio accesses that provide infrastructure oriented radio connection for the nodes.

12. The system of claim 11, wherein the radio accesses include at least one of a mesh network, a WLAN network, and a cellular network.

13. The system of claim 11, wherein the Ad-Hoc domain provides peer-to-peer single-hop, multi-hop and multi-branch radio communication, including both infrastructure-less and infrastructure-oriented radio communication for the nodes.

14. The system of claim 11, wherein the Ad-Hoc domain includes at least one of fixed nodes and mobile nodes.

15. The system of claim 11, wherein the access domain is configured to transfer multi-hop traffic.

16. The system of claim 11, wherein the access domain is configured to support transfer of authentication for an Ad-Hoc node moving between a single hop and a multihop connection.

17. A method for a communications system that includes a plurality of access domains and backbone entities underlaid by Ad-Hoc domains for provisioning of wireless communication for nodes within an Ad-Hoc service area, and Trunk Nodes adapted to handle connection to/from at least one of the access domains, the Ad-Hoc domains, and the backbone entities, comprising:
   associating the Ad-Hoc domains with one of the backbone entities;
   selecting a trunk node from among the nodes within the Ad-Hoc service area to act as a gateway between nodes within at least one of the Ad-Hoc domains and the one of the backbone entities; and
   communicating information between the Ad-Hoc domains and the one of the backbone entities.

18. The method of claim 17, further comprising selecting the one of the backbone entities from a wired entity and a wireless entity.

19. The method of claim 17, wherein selecting a trunk node to act as a gateway further comprises, selecting the trunk node based on a set of criteria.

20. The method of claim 19, wherein the set of criteria comprises location coordinates, movement characteristics of the nodes, a number of hops, a handover capability, a service profile, service availability, a Quality of Service, a power level, routing metrics, an accounting and billing policy, and an identifier.

21. The method of claim 17, wherein the step of selecting a Trunk Node and a further step of coordinating radio resources of the Trunk Node are performed by an access domain.

22. The method of claim 17, further comprising charging for services relating to the at least one of the Ad-Hoc domains.

23. The method of claim 17, wherein each node within the at least one of the Ad-Hoc domains has a local unambiguous networking address network, in addition to a standard IP address.

24. The method of claim 17, wherein a local Ad-Hoc address is formed based on a local link layer address by utilizing Ad-Hoc protocols, keeping the local Ad-Hoc address auto-configurable.

25. The method of claim 17, further comprising authenticating nodes within the at least one of the Ad-Hoc domains.

26. The method of claim 25, wherein authenticating the nodes within the at least one of the Ad-Hoc domains further comprises allowing only authorized nodes to join the at least one of the Ad-Hoc domains.

27. The method of claim 25, further comprising providing a set of authentication mechanisms including a mechanism for providing authentication signaling, a mechanism for providing authentication, a mechanism for encryption/decryption and integrity check keys arrangement, and a mechanism for generating random parameters used in an authentication algorithm.

28. The method of claim 17, further comprising integrating the Ad-Hoc domain into other networks.

29. The method of claim 17, further comprising allowing the Ad-Hoc domain to be stand-alone and partitioned.

30. The method of claim 17, further comprising providing peer-to-peer single-hop, multi-hop and multi-branch radio communication, including both infrastructure-less and infrastructure-oriented radio communication for the nodes within the at least one of the Ad-Hoc domains.

31. The method of claim 30, further comprising transferring multi hop traffic using the access domain.

32. The method of claim 30, further comprising transferring of authentication for an Ad-Hoc node moving between a single hop and a multihop connection using the access domain.

33. The system of claim 1, wherein the Ad-Hoc domain is automatically arranged to provision multi-hop wireless communication for the nodes within the service area of the Ad-Hoc domain.

34. The system of claim 1, wherein the Ad-Hoc domain is automatically arranged to provision multi-channel wireless communication for the nodes within the service area of the Ad-Hoc domain.

35. A system for a hybrid architecture in a communications system comprising:
  a backbone access network;
  an access domain for radio access to the backbone access network;
  an Ad-Hoc domain underlying the access domain and automatically arranged to provision at least one of multi-hop and multi-channel wireless communication with the access domain for and among nodes that arbitrarily come within a service area of the Ad-Hoc domain;
  a trunk node of the Ad-Hoc domain that is elected from the nodes that arbitrarily come within a service area of the Ad-Hoc domain and is automatically configured to act as a gateway between the nodes within the Ad-Hoc domain and the backbone access network.

36. A method for a communications system that includes a plurality of access domains and entities underlaid by Ad-Hoc domains for automatically provisioning at least one of multi-hop and mult-channel wireless communication for and among nodes within an Ad-Hoc service area, and Trunk Nodes of the Ad-Hoc domains adapted to automatically handle connection to/from at least one of the access domains, the Ad-Hoc domains, and overlaid backbone entities, comprising:
  associating the Ad-Hoc domains with an operator backbone entity;
  selecting a trunk node from the nodes of an Ad-Hoc domain to act as a gateway between the nodes within the Ad-Hoc domain and a backbone entity; and
  communicating information between the Ad-Hoc domain and the backbone entity.

* * * * *

UNITED STATES PATENT AND TRADEMARK OFFICE
CERTIFICATE OF CORRECTION

PATENT NO.    : 6,879,574 B2  
DATED         : April 12, 2005  
INVENTOR(S)   : Siamak Naghian et al.

It is certified that error appears in the above-identified patent and that said Letters Patent is hereby corrected as shown below:

Column 3,
Line 57, delete "orsubnet(s)" and insert -- or subnet(s) --.

Column 17,
Line 29, delete "multihop" and insert -- multi-hop --.

Column 18,
Line 22, delete "mult-channel" and insert -- multi-channel --.

Signed and Sealed this

Ninth Day of May, 2006

JON W. DUDAS
*Director of the United States Patent and Trademark Office*